United States Patent [19]

Kuroda et al.

[11] Patent Number: 5,244,016

[45] Date of Patent: Sep. 14, 1993

[54] PRESSURE ENDURABLE HOSE

[75] Inventors: Masuo Kuroda; Fumihiko Yazaki; Masashi Wakabayashi; Hiroyuki Ohsawa; Naoyuki Ohoka, all of Hiratsuka, Japan

[73] Assignee: The Yokohama Rubber Co., Ltd., Tokyo, Japan

[21] Appl. No.: 9,016

[22] Filed: Jan. 26, 1993

[30] Foreign Application Priority Data

Jan. 29, 1992 [JP] Japan .................................. 4-014301
Oct. 1, 1992 [JP] Japan .................................. 4-263842

[51] Int. Cl.⁵ .......................................... F16L 11/12
[52] U.S. Cl. ..................................... 138/103; 138/104; 138/118; 138/124; 138/129; 138/132; 138/172; 138/178; 138/DIG. 8; 73/40.5 R; 73/49.1
[58] Field of Search ............... 138/103, 104, 118, 109, 138/124, 125, 126, 129, 132, 134, 137, 178, 172, DIG. 8, 123; 73/40.5 R, 49.1, 49.5

[56] References Cited

U.S. PATENT DOCUMENTS

| | | | |
|---|---|---|---|
| 3,119,415 | 1/1964 | Galloway et al. | 138/103 |
| 3,811,477 | 5/1974 | Thawley | 138/103 |
| 3,972,223 | 8/1976 | Torghele | 138/104 |
| 4,153,079 | 5/1979 | Ambrose . | |
| 4,259,553 | 3/1981 | Tanaka et al. | 138/104 |
| 4,427,033 | 1/1984 | Ege | 138/103 |
| 4,465,105 | 8/1984 | Slater | 138/104 |
| 4,554,650 | 11/1985 | Brown | 138/104 |
| 4,567,916 | 2/1986 | Antal et al. | 138/104 |
| 4,775,855 | 10/1988 | Cox | 138/104 |
| 4,942,905 | 7/1990 | Takemae et al. | 138/103 |

FOREIGN PATENT DOCUMENTS

| | | | |
|---|---|---|---|
| 50-144124 | 11/1975 | Japan . | |
| 57-25756 | 5/1982 | Japan . | |
| 1-269785 | 10/1989 | Japan . | |
| 1503502 | 3/1978 | United Kingdom . | |
| 2117479 | 10/1983 | United Kingdom | 138/104 |
| 2138917 | 10/1984 | United Kingdom | 138/104 |

Primary Examiner—James E. Bryant, III
Attorney, Agent, or Firm—Finnegan, Henderson, Farabow, Garrett & Dunner

[57] ABSTRACT

A hose (1) includes a main pressure cord layer (5) for holding a fluid, and an auxiliary pressure cord layer (7) formed so as to sheathe the main pressure cord layer (5) and to form a buffering space (9) for retaining the fluid leaking through the main pressure cord layer (5) between the main pressure cord layer (5) and the auxiliary pressure cord layer (7). The auxiliary cord layer (7) includes first and second cord plies in an asymmetrical structural relation capable of being twisted by the pressure of the fluid leaking through the main pressure cord layer (5). Thus, even if its main pressure cord layer and its rubber tube are damaged leakage of the fluid can be prevented.

6 Claims, 6 Drawing Sheets

PRESSURE ENDURABLE HOSE

BACKGROUND OF THE INVENTION

1. Field of the Invention

The present invention relates to a pressure endurable hose for transporting a fluid, such as oil or the like, and, more specifically, to a hose capable of preventing leakage of the fluid flowing therethrough even if the main pressure cord layer thereof is broken and enabling easy visual recognition of damage to the main pressure cord layer.

2. Related Art

In the prior art, a hose line consisting of a plurality of hoses connected end-to-end is used for loading a tanker with oil or the like or unloading the tanker because, in general, the tanker is moored offshore. Generally, as shown in FIG. 11, the hose for forming such a hose line has, for example, a hose body 21 and flanges 22 for connecting the hose to the adjacent hoses, joined, respectively, to the opposite ends of the hose body 21.

The hose body 21 comprises a rubber tube 23, a main pressure cord layer 24 formed so as to coat the rubber tube 23 by laminating a plurality of cord layers, each formed by helically arranging cords, such as twisted textile cords or steel cords, in a layer and coating the layer with rubber, so that the component cords having different cord layers intersect each other, a reinforcing cord layer 25 formed over the main pressure cord layer 24 to reinforce the main pressure cord layer 24 and to prevent the hose from being flattened by external pressure, and a covering rubber layer 26 formed over the reinforcing cord layer 25.

The flange 22 is provided on the outer circumference of its cylindrical portion 22a with an integral ring 22b for securing the flange 22 to the hose body 21. The flange 22 is connected to the hose body 21 with the sylindrical portion 22a adhesively joined to the end of the hose body 21 and firmly fastened by fastening wires 24a provided at the end of the main pressure cord layer 24 and end wires 25a provided at the end of the reinforcing cord layer 25.

When connecting the hoses end-to-end to form a hose line for transporting oil or the like, when oils passed by force through the hose line or when using the hose line under inclement weather conditions, the hose line can be bent severely and handled without caution. Accordingly, the component hoses of the hose line can be damaged by intense pressure, excessive tensile load and, consequently, the oil or the like can escape from the hose line and create serious environmental pollution.

Furthermore, if the hose is broken thereby rendering the loading operation impossible, the departure of the tanker or the like will be delayed, entailing additional expenses.

SUMMARY OF THE INVENTION

The present invention has been made in view of the foregoing problems in the prior art. It is therefore an object of the present invention to provide a hose having a main pressure cord layer and a rubber tube, and capable of preventing leakage of the fluid flowing through the hose even if the rubber tube and the main pressure cord layer are broken and enabling easy visual recognition of damage to the main pressure cord layer.

To achieve the object, the present invention provides a pressure endurable hose comprising at least a main pressure cord layer for holding a fluid, and an auxiliary pressure cord layer coating the main pressure cord layer, wherein a buffering space is formed between the main pressure cord layer and the auxiliary pressure cord layer, and the auxiliary pressure cord layer consists of first cord plies and second cord plies in an asymmetrical structural relation to each other capable of being twisted by the pressure of the fluid escaping from the main pressure cord layer.

The buffering space for retaining the fluid leaking through the main pressure cord layer, formed between the main pressure cord layer and the auxiliary pressure cord layer retains the fluid leaking through the main pressure cord layer owing to damage to the main pressure cord layer thereof preventing the fluid from escaping from the hose.

In an embodiment of the present invention, each of the first cord plies is formed by extending cords in one helical direction at a first helix angle, each of the second cord plies is formed by extending cords in the opposite helical direction at a second helix angle, the number of first cord plies and second cord plies are different from each other, or the cords forming the first cord plies and those forming the second cord plies are different from each other with respect to the elastic modulus and the sectional area.

Since the auxiliary cord layer consists of the first and second cord plies in an asymmetrical structural relation to each other capable of being twisted by the pressure of the fluid leaking through the main pressure cord layer, the auxiliary cord layer is twisted by the pressure of the fluid leaking through the main pressure cord layer and retained in the buffering space, which enables easy visual recognition of damage to the internal structures of the hose.

In another embodiment of the present invention, the respective structures of the first and second cord plies are substantially symmetrical with respect to a perpendicular to the axis of the hose passing the middle point between the opposite ends of the hose.

When the respective structures of the first and second cord plies are substantially symmetrical with respect to a perpendicular to the axis of the hose passing the middle point between the opposite ends of the hose, the direction of torsion of the hose is inverted in the substantially middle portion of the hose, so that torsional torques acting on the hose are cancelled and hence the torsional torques are not transmitted to the adjacent hoses. Since the torsion of the auxiliary pressure cord layer is not restrained by the adjacent hoses or the like connected to the opposite ends of the hose, the connection of the hose and the adjacent hoses or the like can satisfactorily be maintained and the auxiliary pressure cord layer can assuredly be twisted even if the opposite ends of the hose are connected to the adjacent hoses or the like.

In a further embodiment of the present invention, the buffering space is packed with a sponge having open voids or closed voids.

Since the pressure of the fluid leaking into the buffering space when the main pressure cord layer is broken can be absorbed by the sponge packing the buffering space, impulsive load on the auxiliary pressure cord layer is reduced and the auxiliary pressure cord layer is effectively protected from damage.

DETAILED DESCRIPTION OF THE PREFERRED EMBODIMENTS

Preferred embodiments of the present invention will now be described hereinafter with reference to the accompanying drawings.

Figure 1:
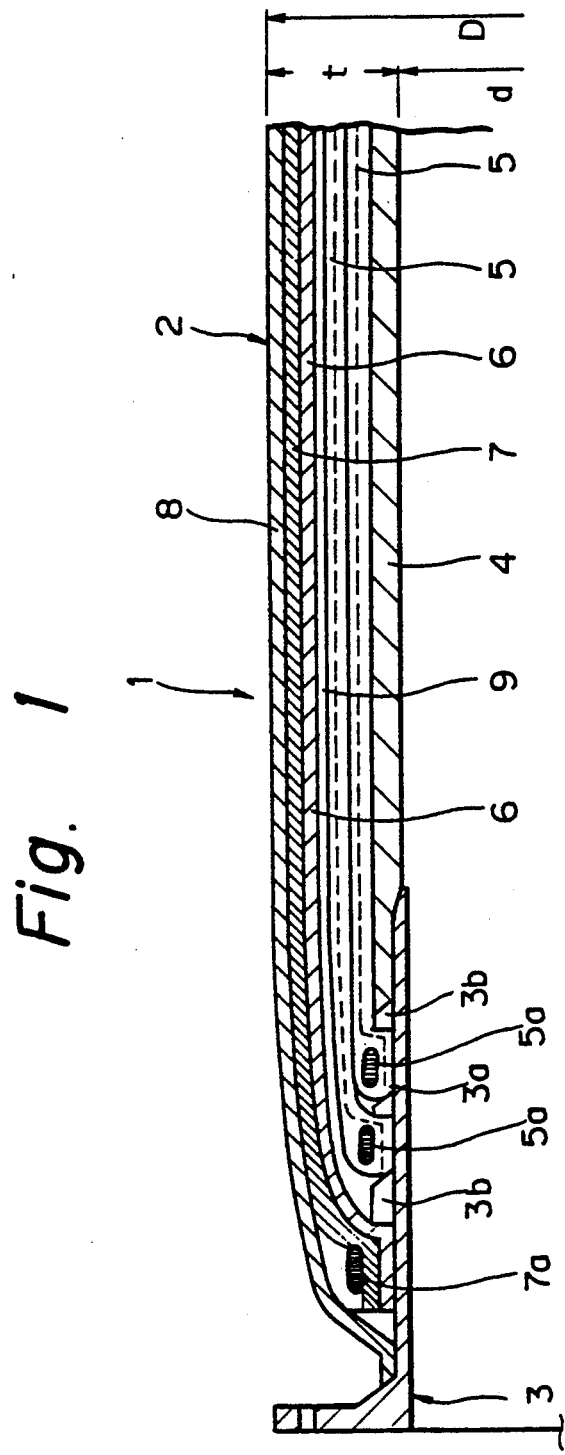
FIG. 1 is a fragmentary, longitudinal sectional view of an end portion of a hose in a first embodiment according to the present invention.

FIG. 1 is a fragmentary, longitudinal sectional view of an end portion of a hose 1 in a first embodiment according to the present invention having a hose body 2 and flanges 3 for connecting the hose 1 to the adjacent hoses, joined respectively to the opposite ends of the hose body 2.

Typically, a small type of such hose has an inner diameter (d) of 150 mm and an outer diameter (D) of 300 mm (t=75 mm), and a large type has an inner diameter (d) of 600 mm and an outer diameter (D) of 1000 mm (t=200 mm).

The hose body 2 consists of a rubber tube 4 of a synthetic rubber, such as acrylonitrile-butadiene rubber (NBR), main pressure cord layers 5 for retaining a fluid, such as oil or the like, flowing through the hose 1 and coating the rubber tube 4, an intermediate rubber layer 6 of NBR or the like surrounding the main pressure cord layer 5, an auxiliary pressure cord layer 7 capable of retaining the fluid leaking through the rubber tube 4 and the main pressure cord layers 5 and coating the intermediate rubber layer 6, and a covering rubber layer 8 of a synthetic rubber, such as styrene-butadiene rubber (SBR), coating the auxiliary pressure cord layer 7.

A liquid-tight buffering space 9 is formed between the main pressure cord layer 5 and the intermediate rubber layer 6 adhesively stuck to the auxiliary pressure cord layer 7 to receive and retain the fluid leaking through the rubber tube 4 and the main pressure cord layers 5. The buffering space 9 is formed beforehand or the main pressure cord layer 5 and the intermediate rubber layer 5 are adhered together so that the main pressure cord layer 5 and the intermediate rubber layer 6 can be separated by the pressure of the fluid leaking through the rubber tube 4 and the main pressure cord layers 5 and the buffering space 9 can be formed.

Figure 2:
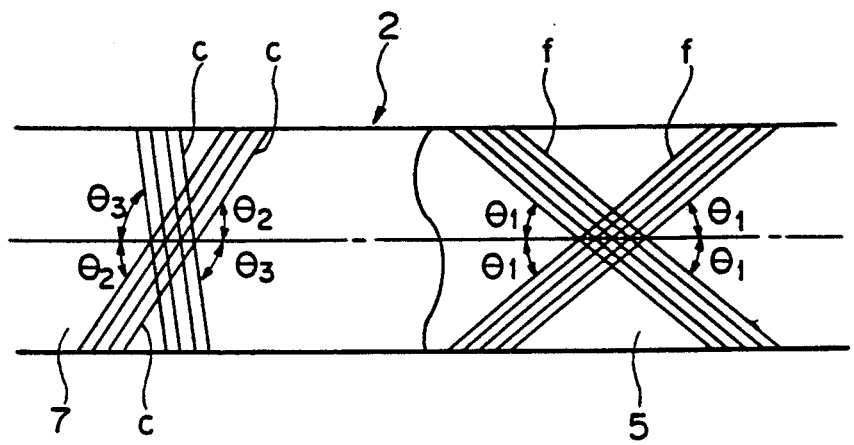
FIG. 2 is a diagrammatic view explaining the arrangement of cords forming a main pressure cord layer and that of cords forming cord plies in an asymmetrical structural relation to each other of an auxiliary pressure cord layer.

As shown in FIG. 2, the main pressure cord layer 5 consists of cord plies each formed by helically winding cords f produced by twisting nylon strands, polyester strands, rayon strands, aromatic polyamide strands or steel wires and coating the cord ply of the cords f with SBR or the like. The cords plies of the cords f include first cord plies each consisting of the cords f extending in one helical direction at a helix angle $\theta_1$, and second cord plies each consisting of the cords f in the opposite helical direction at the same helix angle $\theta_1$. The number of the first cord plies is equal to that of the second cord plies.

The helix angle $\theta_1$ is in a range defined by $30° < \theta_1 < 60°$, more preferably, in a range defined by $35° < \theta_1 < 55°$. The helix angle $\theta$ below 30° deteriorates the flexibility of the hose body 2 and the helix angle $\theta_1$ greater than 60° makes the hose body 2 excessively flexible, which makes the hose 1 difficult to handle. The helix angle $\theta_1$ greater than 35° and not greater than 55° enables the cord plies to impart flexibility to the hose body 2 and efficiently enhances the pressure-withstanding strength of the hose body 2.

The auxiliary cord layer 7 comprises at least one first cord ply and one second cord ply capable of being twisted by the pressure of the fluid leaking through the rubber tube 4 and the main pressure cord layer 5. The first cord ply and the second cord ply are in an asymmetrical structural relation to each other.

As shown in FIG. 2, the first cord ply is formed by helically extending cords c produced by twisting nylon strands, polyester strands, rayon strands, aromatic polyamide strands or steel wires in one helical direction at a helix angle of $\theta_2$ and coating the cords c with SBR or the like, and the second cord ply is formed by helically extending cords c produced by twisting nylon strands, polyester strands, rayon strands, aromatic polyamide strands or steel wires in the opposite helical direction at an helix angle $\theta_3$.

The relation between the helix angles $\theta_2$ and $\theta_3$ is expressed by $\theta_2 < \theta_3 < 90°$ and, preferably, $80° < \theta_3 < 90°$. It is desirable, to avoid placing the cord plies in an asymmetrical structural relation to each other so as to be influenced by the pressure of the fluid flowing through the hose 1, that $\theta_1 < \theta_2 < \theta_1 + 20°$, more preferably, $\theta_1 < \theta_2 < 60°$.

When the respective helix angles $\theta_1$, $\theta_2$ and $\theta_3$ of the cords f forming the main pressure cord layer 5, the cords c forming the first cord ply of the auxiliary pressure cord layer 7 and the cords c forming the second cord ply of the auxiliary pressure cord layer 7 are in the foregoing relationship, the auxiliary pressure cord layer 7 is twisted conspicuously by the pressure of the fluid leaking through the rubber tube 4 and the main pressure cord layer 5 thereby enabling easy visual recognition of damage to the rubber tube 4 and the main pressure cord layer 5 of the hose 1.

Preferably, the buffering space 9 is packed with sponge or the like having open or closed voids. The sponge filling up the buffering space 9 serves as a pressure buffering layer for absorbing the pressure of fluid issuing through the rubber tube 4 and the main pressure cord layer 5 into the buffering layer 9 in the event that the rubber tube 4 and the main pressure cord layer 5 are damaged. Thus, the sponge reduces an impulsive load that will otherwise act on the intermediate rubber layer 6 and protects the auxiliary pressure cord layer 7 from damage.

The flange 3 is provided on the outer circumference of its cylindrical portion 3a integrally with anchoring rings 3b for anchoring the hose body 2 to the flange 3.

When the flange 3 is inserted in one end of the hose body 2, fastening wires 5a and 7a provided at the respective ends of the main pressure code layer 5 and the non-symmetrical cord plies i.e., the auxiliary pressure cord layer 7, respectively, fit in spaces between the anchoring rings 3b to fasten the hose body 2 to the flange 3, and the respective ends of the component layers of the hose body 1 are adhesively joined together.

The number of first cord plies each formed by helically extending the cords c in one helical direction and coating the helical arrangement of the cords c with SBR or the like and the second cord plies each formed by helically extending the cords c in the opposite helical direction and coating the helical arrangement of the cords c with SBR or the like may be an odd number, or the number of first cord plies and second cord plies are different from each other and the sum or the number of first cord plies and second cord plies is an even number (the helix angle $\theta_2$ is equal to the helix angle $\theta_3$).

The first cord plies and the second cord plies may be formed so that the cords c of the first cord plies and the second cord plies intersect each other, and the cords c of the first cord plies and the second cord plies may be different from each other with respect to the elastic modulus and the sectional area. For example, cords c of the first cord plies and the second cord plies may be steel cords and nylon cords, respectively. The auxiliary pressure cord layer 7 consisting of such first and second cord plies is capable of being twisted by the pressure of the fluid leaking through the rubber tube 4 and the main pressure cord layers 5 thereby enabling easy recognition of damage to the rubber tube 4 and the main pressure cord layer 5 of the hose 1.

The foregoing cord plies in an asymmetrical structural relation to each other may be used in combination to form the auxiliary pressure cord layer 7. For example, the respective helix angles $\theta_2$ and $\theta_3$ of the cords c of the first cord plies and the second cord plies may be different from each other, and the cords c of the first cord plies may be steel cores and those of the second cord plies may be nylon cords. The auxiliary pressure cord layer 7 consisting of such first and second cord plies is twisted more conspicuously by the pressure of the fluid leaking through the rubber tube 4 and the main pressure cord layer 5, which enables further easy visual recognition of damage to the rubber tube 4 and the main pressure cord layer 5 of the hose 1.

Figure 3:
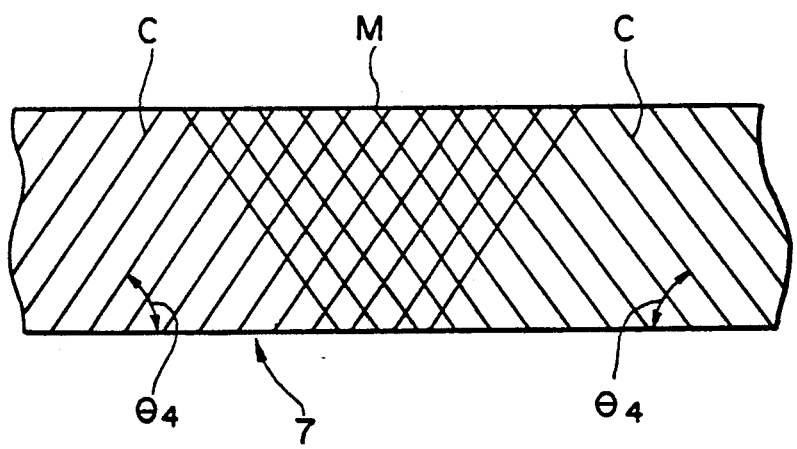
FIG. 3 is a fragmentary, schematic front view of an auxiliary pressure cord layer consisting of cord plies each having a structure symmetrical with respect to a perpendicular to the axis of the hose passing the middle point between the opposite ends of the hose.

The cords c of the first and second cord plies may be extended so that the respective structures of the first and second cord plies are substantially symmetrical with respect to a perpendicular to the axis of the hose body 2 passing the substantially middle point M between the opposite ends of the hose body 2; that is, as shown in FIG. 3, the cords c are extended between one end of the hose body 2 and the middle point M in one helical direction at a helix angle $\theta_4$, and then the cords c are extended between the middle point M and the other end of the hose body 2 in the opposite helical direction at the same helix angle $\theta_4$ so that the cords c are extended substantially symmetrical with respect to the perpendicular to the axis of the hose body 2 passing the middle point M. A cord ply formed by winding the cord c in such a manner can be formed, for example, by winding the cord c in one helical direction between one end of the hose body 2 and a position beyond the middle point M and winding the cord c in the opposite helical direction between a position before the middle point M and the other end of the hose body 2 so that helical coils of the former cord c and the helical coils of the latter cord c overlap each other in a longitudinal range equally extending on the opposite sides of the middle point M.

When the first and second cord plies are such cord plies each having a substantially symmetrical structure with respect to the perpendicular to the axis of the hose body 2 passing the middle point M, one half portion of the hose 1 on one side of the middle point M and the other half portion of the hose 1 on the other side of the middle point M are twisted, respectively, in opposite directions and the torque of the former portion of the hose 1 and that of the latter portion of the hose 1 cancel each other.

The operation of the present invention will briefly be described hereinafter with reference to diagrams explaining the principle of the present invention.

Figure 4:
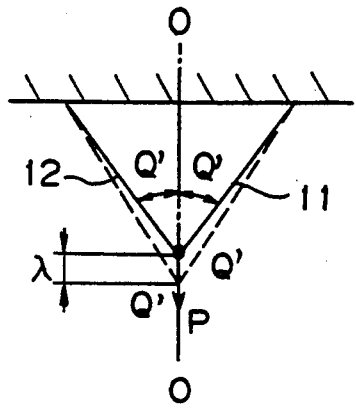
FIG. 4 is a diagram explaining the principle of torsion of the cord plies in a symmetrical structural relation to each other.

Referring to FIG. 4, members 11 and 12 are extended at the same angles $\theta'$ to an axis O—O and intersect each other at a point Q'. The members 11 and 12 have a sectional area A, an elastic modulus E and a length L. When a force P is applied to the point Q' as indicated in the arrow, the point Q' is shifted by a displacement $\lambda$ along the axis O—O.

The displacement $\lambda$ is expressed by the following expression.

$$\lambda = PL/2AE \cos^2\theta'$$

Figure 5:
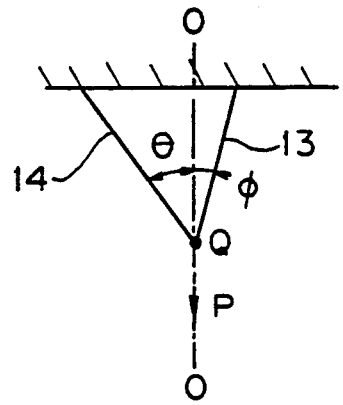
FIG. 5 is a diagram explaining the principle of torsion of the cord plies in an asymmetrical relation to each other.
Figure 6:
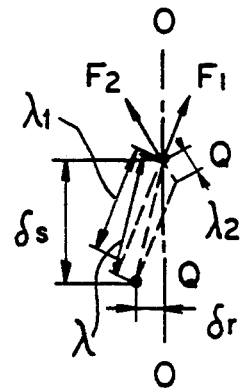
FIG. 6 is a diagram explaining the principle of torsion of the cord plies in an asymmetrical structural relation to each other.

Referring to FIG. 5, members 13 and 14 are extended at angles $\phi$ and $\theta$, respectively, to an axis O—O and intersect each other at a point Q. The member 13 has a sectional area $A_1$, an elastic modulus $E_1$ and a length $L_1$, the member 14 has a sectional area $A_2$, an elastic modulus $E_2$ and a length $L_2$, and $A_1 \cdot E_1 < A_2 \cdot E_2$. When a force P is applied to the point Q as indicated by the arrow, the members 13 and 14 are strained differently and the point Q is shifted as shown in FIG. 6.

Therefore, the path of the point Q deviates from the axis O—O and the point Q is displaced horizontally by a horizontal displacement $\delta_r$ from the axis O—O. If such a phenomenon occurs in the hose 1, the hose 1 is twisted.

The horizontal displacement $\delta_r$ can be determined by using the following expressions, in which $F_1$ and $F_2$ are the components of the force P respectively acting on the members 13 and 14, $\lambda_1$ and $\lambda_2$ are the respective displacements of the members 13 and 14 caused by the components $F_1$ and $F_2$ of the force P $$P = F_1\cos\phi + F_2\cos\theta$$

$$F_1\sin\phi = F_2\sin\theta$$

$$F_2 = F_1(\sin\phi/\sin\theta)$$

$$\begin{aligned}P &= F_1\cos\phi + F_1(\sin\phi/\sin\theta)\cos\theta\\&= F_1\cos\phi + F_1\sin\phi\cdot\cot\theta\\&= F_1(\cos\phi + \sin\phi\cdot\cot\theta)\end{aligned}$$

$$F_1 = P/(\cos\phi + \sin\phi\cdot\cot\theta)$$

$$F_2 = P\sin\phi/(\cos\phi + \sin\phi\cdot\cot\theta)\sin\theta$$

The horizontal displacement $\delta_{r1}$ caused by the member 13 is determined using the following expressions.

$$\delta_{r1} = \lambda_1\sin\phi$$

$$\lambda_1 = F_1L_1/A_1E_1 = (L_1/A_1E_1)\cdot\{P/(\cos\phi+\sin\phi\cdot\cot\theta)\}$$

$$\delta_{r1} = PL_1\sin\phi/A_1E_1(\cos\phi+\sin\phi\cdot\cot\theta)$$

The horizontal displacement $\delta_{r2}$ caused by the member 14 is determined using the following expression.

$$\delta_{r2} = \lambda_2\sin\theta$$

$$\begin{aligned}\lambda_2 &= F_2L_2/A_2E_2\\&= (L_2/A_2E_2)\{P\sin\phi/(\cos\phi + \sin\phi\cdot\cot\theta)\sin\theta\}\end{aligned}$$

$$\delta_{r2} = (L_2/A_2E_2)\{P\sin\phi\sin\theta/(\cos\phi + \sin\phi\cdot\cot\theta)\sin\theta\}$$

Therefore, $$\delta_r = \delta_{r1} - \delta_{r2}$$

The vertical displacement $\delta_s$ can similarly be determined.

The same results are obtained when the members 13 and 14 are formed having materials of the same properties and the angles $\phi$ and $\theta$ of the members 13 and 14 to the axis O—O are different or when the members 13 and 14 are formed of materials having different properties and the angles $\phi$ and $\theta$ of the members 13 and 14 to the axis O—O are equal.

Accordingly, even if the rubber tube 4 and the main pressure cord layer 5 are broken and fluid leaks through the main pressure cord layer 5 into the buffering space 9, the cords c of the first and second cord plies of the auxiliary pressure cord layer 7 in an asymmetrical structural relation to each other are dislocated relative to each other by the pressure of the fluid retained in the buffering space 9 to twist the first and second cord plies, so that the breakage of the rubber tube 4 and the main pressure cord layer 5 can readily be recognized by visual observation of the hose 1.

The degree of torsion of the first cord plies and the second cord plies in an asymmetrical relation increases with an increase in the difference in the sectional area and the elastic modulus of the component cords c between the first cord plies and the second cord plies. Basically, the effect on the torsion of the first and second plies of the difference in the sectional area and the elastic modulus, for example, the difference between steel cords and nylon cords, is higher than the difference in the helix angle.

The same is true with the hose 1 provided with the first and second cord plies each having a structure substantially symmetrical with respect to a perpendicular to the axis of the hose 1 passing the middle point M between the opposite ends of the hose 1. One half portion of this hose 1 on one side of the middle point M and the other half portion of the same on the other side of the middle point M are twisted, respectively, in opposite directions, so that the torque of the former half portion and that of the latter half portion cancel each other and hence the torsion of the hose 1 is not transmitted to the adjacent hoses or the like connected to the twisted hose 1. Since the torsion of the auxiliary pressure cord layer 7 is not restrained by the adjacent hoses or the like connected to the opposite ends of the hose 1, the hose 1 provided with the auxiliary pressure cord layer 7 consisting of first and second cord plies each having a structure substantially symmetrical with respect to the perpendicular passing the middle point M is more desirable than the hose 1 provided with the auxiliary pressure cord layer 7 consisting of first and second cord plies each having a structure asymmetrical with respect to the perpendicular passing the middle point M.

Figure 7:
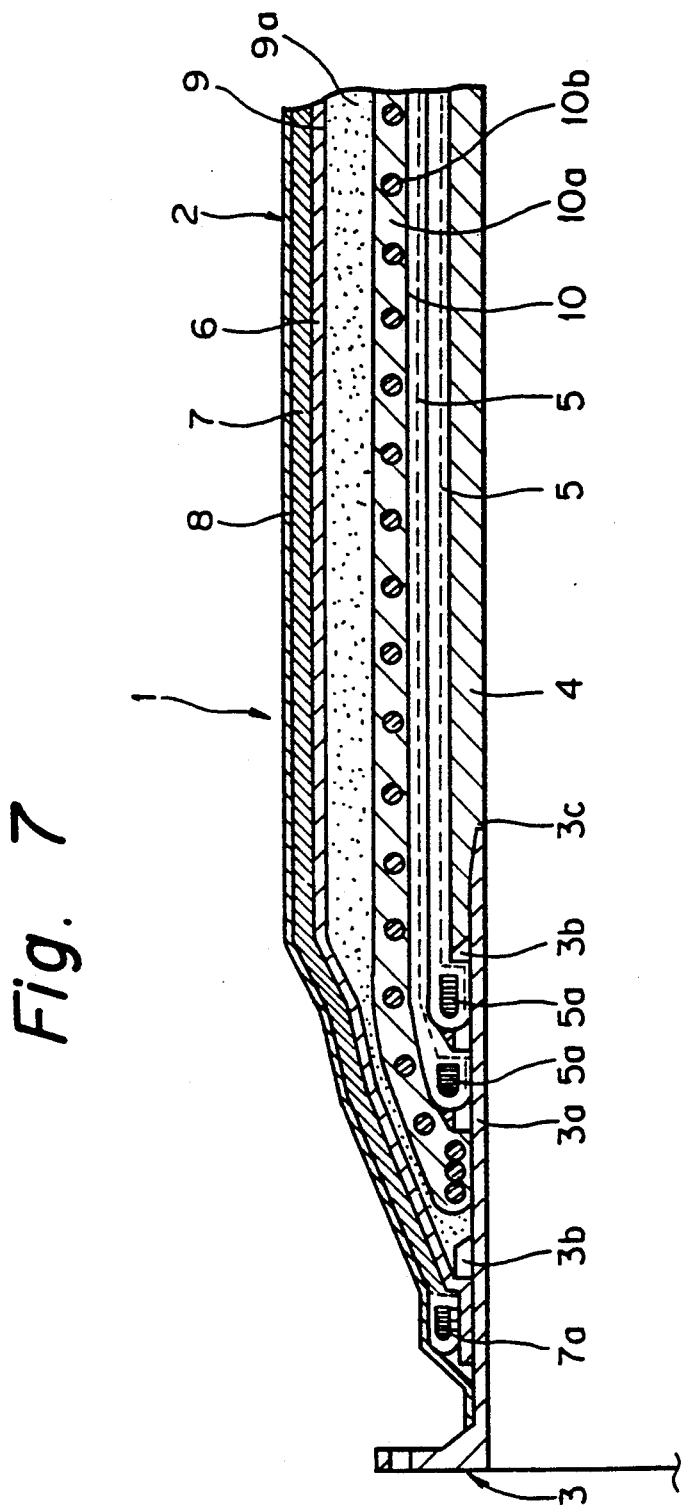
FIG. 7 is a fragmentary, longitudinal sectional view of an end portion of a hose in a second embodiment according to the present invention.

A hose 1 in a second embodiment according to the present invention is shown in FIG. 7, in which parts similar or corresponding to those of the first embodiment are denoted by the same reference characters and the description thereof will be omitted. As shown in FIG. 7, the hose 1 has a main pressure cord layer 5, which is similar to that of the first embodiment, a reinforcing cord layer 10 coating the main pressure cord layer 5, and an intermediate rubber layer 6 formed around the reinforcing cord layer 10 so as to form a buffering space 9 between the intermediate rubber layer 6 and the reinforcing cord layer 10. The buffering space 9 is packed with a buffering material 9a.

The reinforcing cord layer 10 prevents the hose body 2 from being flattened by external pressure and reinforces the main pressure cord layer 5. The reinforcing cord layer 10 has a rubber layer 10a of SBR or the like, and a cord ply formed by helically winding a reinforcing cord 10b, such as a steel cord or wire, embedded in the rubber layer 10a.

The buffering material 9a packing the buffering space 9 is a sponge or the like having open voids or closed voids. The pressure buffering layer formed by packing the buffering space 9 with the buffering material 9a, such as a sponge or the like, absorbs the pressure of the fluid leaking through the rubber tube 4 and the main pressure cord layer 5 when the rubber tube 4 and the main pressure cord layer 5 are broken and reduces the impulsive force that will otherwise act on the intermediate rubber layer 6 thereby effectively protecting the auxiliary pressure cord layer 7 from damage.

The hose 1 having the reinforcing cord layer 10 coating the main pressure cord layer 5, and the buffering space 9 formed between the reinforcing cord layer 10 and the intermediate rubber layer 6 and packed with the buffering material 9a, similarly to the hose 1 in the first embodiment, is twisted when the rubber tube 4 and the main pressure cord layer 5 are broken and the cords c of the first and second cord plies in an asymmetrical structural relation to the auxiliary pressure cord layer 7 are dislocated by the pressure of the fluid leaking into the buffering space 9 to twist the first and second cord plies, so that breakage of the rubber tube 4 and the main pressure cord layer 5 can be readily recognized.

Figure 8:
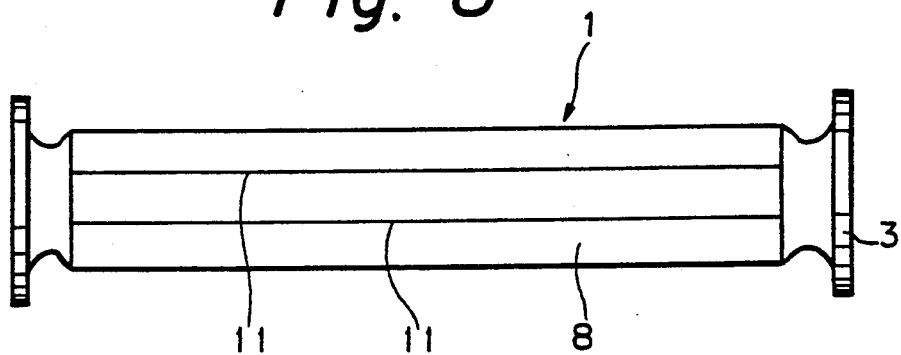
FIG. 8 is a front view of a hose of the present invention provided with torsion indicating marks.

As shown in FIG. 8, torsion indicating marks 11 may be formed in the surface of the covering rubber layer 8 of the hose 1 to facilitate visual recognition of the torsion of the first and second cord plies of the auxiliary pressure cord layer 7. The torsion indicating marks 11 ensure correct visual recognition of the torsion of the first and second cord plies of the auxiliary pressure cord layer 7 to find the internal breakage of the hose 1.

Figure 9:
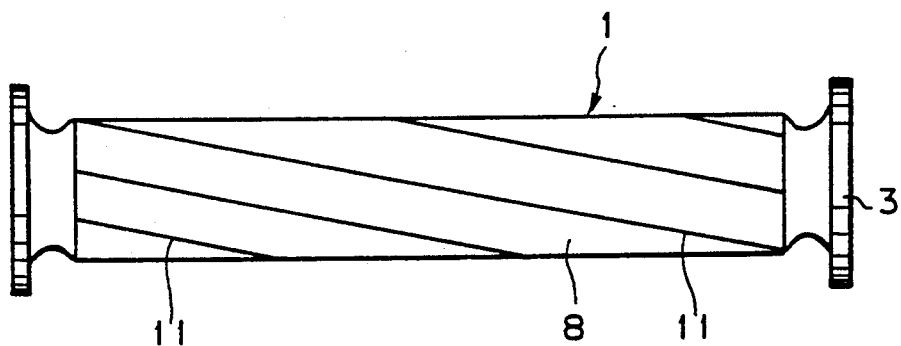
FIG. 9 is a front view of a twisted hose provided with an auxiliary pressure cord layer consisting of cord plies each having a structure asymmetrical with respect to a perpendicular to the axis of the hose passing the middle point between the opposite ends of the hose.
Figure 10:
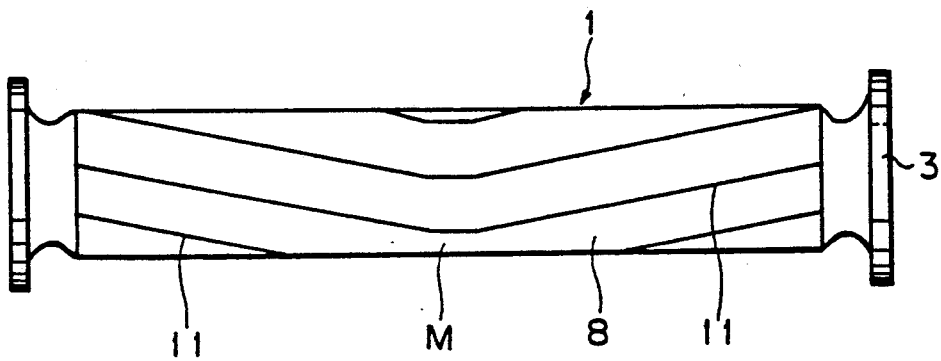
FIG. 10 is a front view of a twisted hose provided with an auxiliary pressure cord layer consisting of cord plies each having a structure symmetrical with respect to a perpendicular to the axis of the hose passing the middle point between the opposite ends of the hose.
Figure 11:
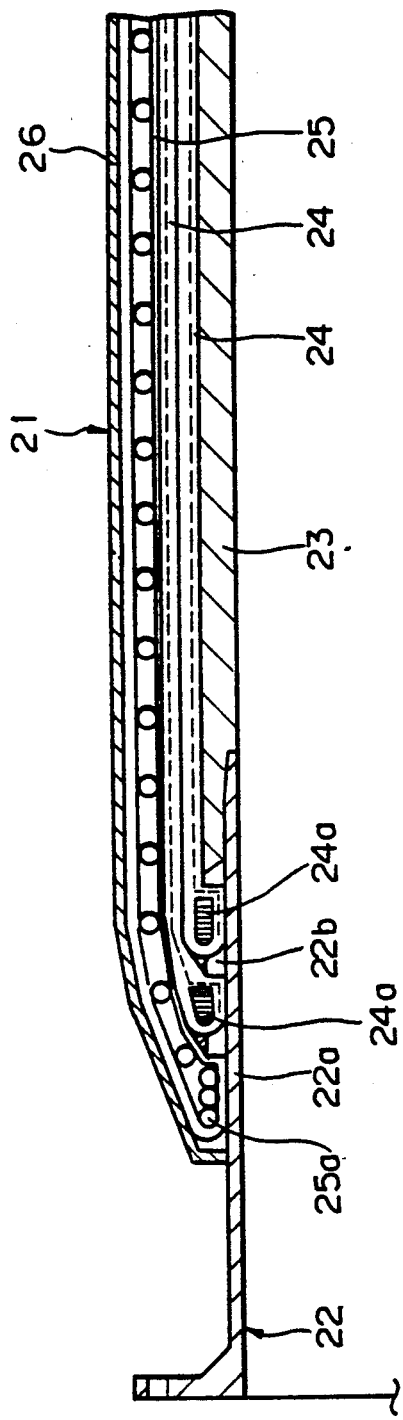
FIG. 11 is a fragmentary, longitudinal sectional view of an end portion of a prior art hose.

FIGS. 9 and 10 are front views of the hoses 1 provided with the torsion indicating marks 11 in their outer surfaces, showing their appearance after internal damage occurs in the hoses 1. FIG. 9 shows the hose 1, which is equivalent to the hose 1 in the second embodiment, having the auxiliary pressure cord layer 7 consisting of the first and second cord plies each having a structure asymmetrical with respect to a perpendicular to the axis of the hose body 2 passing the middle point M. The hose 1 is 300 mm in inside diameter, 450 mm in outside diameter and 6 m in effective length, i.e., the length between the inner ends 3c of the cylindrical portions 3a of the flanges 3. The first cord plies are formed by extending polyester cords at a helix angle $\theta_2$ of 55°, the second cord plies are formed by extending nylon cords at a helix angle $\theta_3$ of 85°, the buffering space 9 is packed with a sponge having open voids to form a pressure buffering layer, and the torsion indicating marks 11 having straight lines as shown in FIG. 8 are formed on the surface of the covering rubber layer 8.

The rubber tube 4 and the main pressure cord layer 5 were broken thereby producing a pressurized fluid (water) sealed in the hose 1 and pressurized at a pressure or 3.0 kgf/cm², which is lower than a pressure normally applied to oil or the like in conducting the same through the hose 1, and then flowed into the buffering space 9 for a torsion test, where the torsion of the hose 1 (the torsion of the first and second cord plies) was measured.

As shown in FIG. 9, the torsion indicating marks 11, i.e., the straight lines, formed on the surface of the covering rubber layer 8 were twisted, indicating the torsion of the hose 1. The angle of torsion over the effective length f the hose 1 was 180°, i.e., 30° per meter.

FIG. 10 shows the hose 1 having a structure similar to that of the hose 1 shown in FIG. 9, except that the hose 1 of FIG. 10 is provided with an auxiliary pressure cord layer 7 consisting of first and second cord plies each having a structure substantially symmetrical with respect to a perpendicular to the axis of the hose body 2 passing the middle point M between the opposite ends of the hose 1. Each cord ply is formed by helically winding a cord in one helical direction between one end of the hose body 2 and a position beyond the middle point M and helically winding the cord in the opposite direction between a position before the middle point M and the other end of the hose body 2 so that the helical coils of the former cord and those of the latter cord overlap each other in a longitudinal range equally extending on opposite sides of the middle point M. The hose 1 was subjected to the same torsion test. As shown in FIG. 10, the torsion indicating marks 11 formed in one half portion of the hose 1 on one side of the middle point M and those formed in the other half portion of the same on the other side of the middle point M were twisted, respectively, in opposite directions. The angle of torsion was 30° per meter.

The auxiliary pressure cord layer 7 consisting of first and second cord plies in an asymmetrical structural relation to each other enables easy visual recognition of the damage to the rubber tube 4 and the main pressure cord layer 5 of the hose 1. The first and second cord plies each have a structure substantially symmetrical with respect to the perpendicular to the axis of the hose 1 passing the middle point M thereby trusting one half portion of the hose 1 on one side of the middle point M and the other half portion of the same on the other side of the middle point M, respectively, in opposite directions when internal damage occurs in the hose 1, so that the respective torques of the half portions of the hose 1 cancel each other. Accordingly, torque produced by the torsion of the hose 1 is not transmitted to the adjacent hoses or the like and the hose is twisted when internal damage occurs in the hose because the torsion of the auxiliary pressure cord layer 7 is not restrained by the adjacent hoses or the like connected to the opposite ends of the hose 1.

Basically, the first and second cord plies of the auxiliary pressure cord layer 7 can be twisted when the component cords c are elongated in directions other than the longitudinal direction and circumferential direction of the hose 1 by a force acting thereon. The present invention is not limited in its application to the preferred embodiments specifically described herein and may be practiced otherwise than as specifically described herein.

As stated above, the hose of the present invention has the main pressure cord layer for holding a fluid, and an auxiliary pressure cord layer formed so as to sheathe the main pressure cord layer and form the buffering space between the main pressure cord layer and the auxiliary pressure cord layer, and the auxiliary pressure cord layer consists of the first cord plies and the second cord plies in an asymmetrical structural relation to each other and is capable of retaining the fluid leaking into the buffering space through the main pressure cord layer when the rubber tube and the main pressure cord layer are damaged. Thus, the hose is capable of preventing the fluid from escaping thereby preventing environmental pollution and the entailment of additional expenses as a result of a delay in loading and a subsequent a delay in the departure of a tanker or the like.

When the fluid leaks through the main pressure cord layer, the auxiliary pressure cord layer is twisted by the pressure of the fluid retaining in the buffering space, which enables easy visual recognition of damage to the internal structure of the hose.

The auxiliary pressure cord layer consisting of first and second cord plies each having a structure symmetrical with respect to a perpendicular to the axis of the hose passing the middle point between the opposite ends of the hose causes one half portion of the hose on one side of the middle point and the other half portion of the same on the other side of the middle point to be twisted, respectively, in opposite directions, so that the torque of the former half portion of the hose and that of the latter half portion of the same cancel each other and the torque produced in the hose is not transmitted to the adjacent hoses or the like. Since the torsion of the auxiliary pressure cord layer is not restrained by the adjacent hoses or the like, connection of the hose to the adjacent hoses or the like is satisfactorily maintained and the hose can be twisted even if the hose is connected to the adjacent hoses or the like.

The sponge packing the buffering space absorbs the pressure of the fluid leaking through the main pressure cord layer when the main pressure cord layer is damaged thereby preventing damage to the auxiliary pressure cord layer by reducing an impulsive force that will otherwise act on the auxiliary pressure cord layer.

We claim:

1. A hose comprising at least a main pressure cord layer for retaining a fluid, and an auxiliary cord layer sheathing the main pressure cord layer, wherein a buffering space for retaining the fluid leaking through the main pressure cord layer is formed between the main pressure cord layer and the auxiliary pressure cord layer, and the auxiliary pressure cord layer includes first cord plies and second cord plies that are in an asymmetrical structural relation to each other, capable of being twisted by the pressure of the fluid leaking through the main pressure cord layer.

2. A hose according to claim 1, wherein said first and second cord plies in an asymmetrical structural relation to each other are formed, respectively, by extending cords in one helical direction at a first helix angle and extending cords in the opposite helical direction at a second helix angle different from the first helix angle.

3. A hose according to claim 1, wherein said first and second cord plies in an asymmetrical structural relation to each other are formed, respectively, by extending cords in one helical direction and extending cords in the opposite helical direction, and the number of first cord plies and second cord plies are different.

4. A hose according to claim 1, wherein said first and second cord plies in an asymmetrical structural relation to each other are formed, respectively, by extending cords in one helical direction and extending cords in the opposite helical direction, and the cords forming the first cord plies and those forming the second cord plies differ from each other in elastic modulus and sectional area.

5. A hose according to claim 1, wherein the respective structures of the first and second cord plies are substantially symmetrical with respect to a perpendicular to the axis of the hose passing the middle point between the opposite ends of the hose.

6. A hose according to claim 1, wherein said buffering space is packed with a sponge having open voids or closed voids.

* * * * *